Patented Aug. 28, 1945

2,383,622

UNITED STATES PATENT OFFICE 2,383,622

CYCLIC ACETALS OF UNSATURATED ALDEHYDES

Murray Senkus, Terre Haute, Ind., assignor to Commercial Solvents Corporation, Terre Haute, Ind., a corporation of Maryland No Drawing. Application May 17, 1943, Serial No. 487,335

8 Claims. (Cl. 260—338)

The present invention relates to new and useful cyclic acetals of unsaturated aldehydes. More particularly, it is concerned with cyclic acetals having the following general formula:

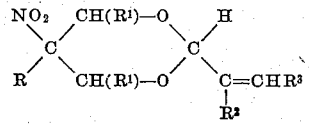

in which R may represent hydrogen, α-hydroxyakyl, or an alkyl group; $R^1$ may be either alkyl, aryl, furyl, or hydrogen; $R^2$ represents hydrogen, aryl, or alkyl; and $R^3$ may be either alkyl or aryl, the substituents $R^2$ and $R^3$ representing the following combinations of groups respectively, and no others: hydrogen and aryl, alkyl and alkyl, aryl and alkyl, and aryl and aryl.

Unsaturated 5-nitro-1,3-dioxanes included by the above formula are: 5-nitro-5-methyl-2-(1-methylstyryl)-1,3-dioxane, 5-nitro-5-methyl-2-(1-phenylstyryl)-1,3-dioxane, 5-nitro-5-ethyl-2-(1-methyl-1-butenyl)-1,3-dioxane, 5-nitro-5-hydroxymethyl-2-(1-ethyl-1-pentenyl)-1,3-dioxane, 5-nitro-5-ethyl-2-(1-ethyl-1-pentenyl)-1,3-dioxane, 5-nitro-2-(1-ethylstyryl)-1,3-dioxane, 5-nitro-5-hydroxymethyl-2-styryl-1,3-dioxane and the like.

Compounds of the above type are prepared by distilling a mixture consisting of a suitable polyhydroxy nitro compound and the desired unsaturated aldehyde in the presence of a small amount of an acid catalyst, such as concentrated hydrochloric acid, sulfuric acid, or benzenesulfonic acid. Generally, it will be found desirable to carry out the reaction in the presence of a liquid capable of removing the water produced during the condensation, as a constant boiling mixture with said liquid. Benzene and toluene are typical examples of such materials.

The compounds produced in this manner may be obtained in a relatively pure state by washing the crude reaction mixture with a suitable quantity of water. If necessary, a dilute solution of a weak alkaline material, such as sodium carbonate, may first be employed to neutralize the acid catalyst present, followed by washing with water to remove any additional impurities. The liquid cyclic acetals produced in such instances are preferably dried over a solid dehydrating agent, such as calcium chloride or anhydrous calcium sulfate, and then distilled. However, these compounds may also be dehydrated by distilling the same with benzene or similar organic liquids. The compounds of the present invention, which are normally solids at room temperature, are separated from the reaction mixture by filtration, or any other satisfactory means, after which they may be conveniently purified at temperatures slightly above their melting point by washing, if desired, with a dilute solution of sodium bicarbonate, followed by treatment with water. Upon cooling, the solid product thus obtained may be further freed from impurities by recrystallization from a solvent, such as methyl alcohol, ether, benzene, and the like. Colored impurities in either the liquid or solid products may be effectively removed by means of heating the same in the presence of small quantities of finely-divided charcoal or other decolorizing substances.

The unsaturated cyclic nitro acetals of my invention possess certain characteristics that serve to readily distinguish them from any other unsaturated cyclic nitro acetals as well as the unsaturated cyclic acetals prepared from unsaturated aldehydes, of the class employed in the present invention, and unsubstituted glycols. One of the most striking of such characteristic differences is the fact that under identical conditions of catalytic liquid phase hydrogenation, the compounds of the present invention yield unsaturated cyclic amino acetals; whereas in the case of the unsaturated cyclic nitro acetals not included within the scope of my invention, as well as with the unsaturated cyclic acetals prepared from unsaturated aldehydes and unsubstituted glycols, such compounds are completely saturated as the result of such treatment.

Polyhydroxy nitro compounds which may be employed in the present invention may be any of such compounds which are capable of forming cyclic acetals under the described conditions, and it is to be understood that the expression "polyhydroxy nitro compounds" is to be interpreted as such. More specifically, these compounds may be represented by the following general formula:

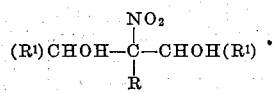

in which $R^1$ may represent hydrogen, alkyl, aryl, or furyl, and R may represent hydrogen, alkyl, or α-hydroxyalkyl. Specific examples of polyhydroxy nitro compounds included by the above formula are: tris-(hydroxymethyl)nitromethane, 2-methyl-2-nitro-1,3-propanediol, 2-ethyl-2-nitro-1,3-propanediol, 2-propyl-2-nitro-1,3-propanediol, 2-isopropyl-2-nitro-1,3-propanediol, 2-nitro-2-isobutyl-1,3-propanediol, 2,8-dimethyl-5-nitro-4,6-nonanediol, 1,3-diphenyl-2-nitro-1,3-propanediol, 2-nitro-1,3-difuryl-1,3-propanediol and the like.

The aldehydes which may be utilized in the preparation of these cyclic acetals of the present invention may be represented by the general formula:

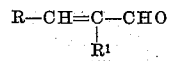

in which R may represent an aryl or an alkyl group, and R¹ represents hydrogen, aryl and alkyl, the substituents R and R¹ representing the following groups respectively and no others: aryl and hydrogen, alkyl and alkyl, aryl and alkyl, and aryl and aryl. Examples of specific aldehydes included by such formula are: α-ethyl-β-methylacrolein, α-ethyl-β-propylacrolein, α-methyl-β-ethylacrolein, cinnamic aldehyde, α-methylcinnamic aldehyde, α-ethylcinnamic aldehyde, α-phenylcinnamic aldehyde and the like.

The examples which follow are illustrative of the present invention.

*Example I*

5-nitro-5-ethyl-2-(1-methyl-1-butenyl)-1,3-dioxane was prepared by distilling a mixture consisting of 126 parts of α-methyl-β-ethylacrolein, 149 parts of 2-nitro-2-ethyl-1,3-propanediol, 250 parts of benzene, and 0.5 part of concentrated sulfuric acid. Heating was continued until substantially all of the water produced during the acetal formation was removed, together with the benzene, in the form of a constant boiling mixture. The crude reaction mixture, thus obtained, was then distilled under reduced pressure, and the fraction boiling at 115° C. (2 mm.) collected. This portion consisted of substantially pure 5-nitro-5-ethyl-2-(1-methyl-1-butenyl)-1,3-dioxane, a colorless liquid having a specific gravity $(d_{20}^{20})$ of 1.0852, and a refractive index $(n_D^{20})$ of 1.4710.

Analysis: Calculated for $C_{11}H_{19}NO_4$: N, 6.11. Found: N, 6.39.

*Example II*

A mixture consisting of 137 parts of tris(hydroxymethyl)nitromethane, 132 parts of cinnamic aldehyde, 300 parts of benzene and 1 part of concentrated hydrochloric acid was heated gently until all of the benzene, together with the water produced by the formation of the acetal, had been completely distilled off. The reaction mixture, thus obtained, solidified, and the crude 5-nitro-5-hydroxymethyl-2-styryl-1,3,-dioxane, purified by recrystallization from benzene. The purified product melted at 149.8° C., and was obtained in a conversion of 45 per cent.

Analysis: Calculated for $C_{13}H_{15}NO_5$: N, 5.26. Found: N. 5.10.

*Example III*

One hundred and twenty-six grams of α-ethyl-β-propylacrolein and 149 grams of 2-nitro-2-ethyl-1,3-propanediol were reacted in accordance with the procedures described in the above examples, resulting in the formation of 150 grams of 5-nitro-5-ethyl-2-(1-methyl-1-pentenyl)-1,3-dioxane, boiling at 127–128° C. (1 mm.). This product was a colorless and odorless liquid soluble in ether, benzene, and methanol, but insoluble in water.

Analysis: Calculated for $C_{12}H_{21}NO_4$: N, 5.45. Found: N. 5.70.

In order to demonstrate more clearly the difference in behavior of the unsaturated cyclic nitro acetals of my invention, and the ordinary unsaturated cyclic acetals, toward catalytic liquid phase hydrogenation, the following example is included:

*Example IV*

One hundred forty parts of 5-nitro-5-ethyl-2-(1-ethyl-1-pentenyl)-1,3-dioxane, 300 parts of methanol, and 5 parts of Raney nickel catalyst were placed in a suitable hydrogenation unit and sealed. This mixture was then subjected to hydrogenation at a pressure of 1500 lbs. per square inch for a period of three hours at a temperature of between 60–70° C. Throughout the hydrogenation step, the mixture was constantly agitated. After absorption of hydrogen had ceased, the reaction mixture was removed from the apparatus, the catalyst separated from the solution by filtration and the methanol removed from the filtrate by fractional distillation. The 5-amino-5-ethyl-2-(1-ethyl-1-pentenyl)-1,3-dioxane obtained in this manner amounted to 80 parts and boiled at 105–108° C. (1 mm.). The product was a colorless, odorless, mobile liquid, and was soluble in methanol, ether and benzene, but insoluble in water. Analysis: Calculated for $C_{13}H_{25}NO_2$: N, 6.17. Found: N, 6.22. The structure of the aminoacetal thus produced was determined by dissolving 15 grams of the latter in 128 grams of 8 per cent sulfuric acid and allowing the resulting solution to stand overnight. This treatment caused the acetal to hydrolyze into the aminohydroxy compound and an aldehyde. The latter rose to the top in the form of an oil and was separated, dried over sodium sulfate and distilled. The aldehyde obtained in this manner boiled at 173° C. (750 mm.), which is the boiling point of α-ethyl-β-propylacrolein.

In a separate experiment, a mixture consisting of 125 parts of 2-(1-ethyl-1-pentenyl)-1,3-dioxane, 400 parts of methanol and 10 parts of Raney nickel catalyst was subjected to hydrogenation under conditions identical with those utilized for the reduction of 5-nitro-5-ethyl-2-(1-ethyl-1-pentenyl)-1,3-dioxane. On completion of the hydrogenation, the 2-(1-ethylpentyl)-1,3-dioxane, thus produced, was separated in the usual manner from the catalyst and solvent. Determination of the extent of reduction was carried out as previously described. The aldehyde isolated in this manner boiled at 163° C. (750 mm.), indicating the presence of substantially pure 2-ethylhexaldehyde. This observation proved conclusively the complete reduction of the above-mentioned unsaturated cyclic acetal.

Cyclic nitro acetals of unsaturated aldehydes, prepared as outlined above, are either colorless liquids or white crystalline solids, and are soluble in the common organic solvents, such as methanol, acetone, and benzene. They have been found to be useful as intermediates in the preparation of various surface active agents. Such compounds are similarly useful as reagents in the synthesis of numerous other valuable organic compounds such as the corresponding unsaturated amino dioxanes which may be prepared in accordance with the procedure described in my copending application, U. S. Serial No. 487,336, filed May 17, 1943. Additional uses for such products will readily occur to those skilled in the art.

My invention now having been described, what I claim is:

1. Cyclic acetals having the following formula:

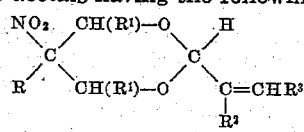

wherein R is a member of the group consisting of hydrogen, alkyl, and α-hydroxyalkyl; R¹ is a member of the group consisting of hydrogen, alkyl, aryl and furyl; R² is a member of the group hydrogen, aryl, and alkyl; and R³ is a member of the group alkyl and aryl, the substituents R² and $R^3$ representing the following combination of groups and no others: hydrogen and aryl, alkyl and aryl, alkyl and alkyl, and aryl and aryl.

2. 5 - nitro - 5 - ethyl - 2 - (1 - ethyl - 1-pentenyl)-1,3-dioxane.

3. 5 - nitro - 5 - ethyl - 2 - (1 - methyl - 1-butenyl)-1,3-dioxane.

4. 5 - nitro - 5 - hydroxymethyl - 2- styryl-1,3-dioxane.

5. In a process for the production of cyclic acetals of unsaturated aldehydes, the step which comprises reacting an unsaturated aldehyde with a polyhydroxy nitro compound in the presence of an acid catalyst, said polyhydroxy nitro compound having the formula:

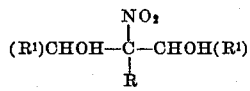

in which $R^1$ is a member of the group consisting of hydrogen, alkyl, aryl and furyl, and R is a member of the group consisting of hydrogen, alkyl, and α-hydroxy-alkyl, said aldehyde having the general formula:

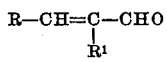

wherein R is a member of the group, aryl and alkyl, and $R^1$ is a member of the group, aryl, hydrogen and alkyl, the substituents R and $R^1$ representing respectively the following combinations of groups and no others: aryl and hydrogen, alkyl and alkyl, aryl and alkyl and aryl and aryl.

6. In a process for the production of 5-nitro-5-hydroxymethyl-2-styryl-1,3-dioxane, the step which comprises reacting cinnamic aldehyde with tris(hydroxymethyl)nitromethane in the presence of an acid catalyst.

7. In a process for the preparation of 5-nitro-5 - ethyl - 2 - (1 - methyl - 1 - butenyl) - 1,3-dioxane, the step which comprises reacting 2-nitro-2-ethyl-1,3-propanediol with α-methyl-β-ethylacrolein in the presence of an acid catalyst.

8. In a process for the preparation of 5-nitro-5 - ethyl - 2 - (1 - ethyl - 1 - pentenyl) - 1,3-dioxane, the step which comprises reacting 2-nitro-2-ethyl-1,3-propanediol with α-ethyl-β-propylacrolein in the presence of an acid catalyst.

MURRAY SENKUS.

CERTIFICATE OF CORRECTION.

Patent No. 2,383,622.   August 28, 1945.

MURRAY SENKUS.

It is hereby certified that error appears in the printed specification of the above numbered patent requiring correction as follows: Page 1, first column, line 12, for "akyl" read --alkyl--; page 2, first column, line 56, Example III, for "(1-methyl" read --(1-ethyl--; and that the said Letters Patent should be read with this correction therein that the same may conform to the record of the case in the Patent Office.

Signed and sealed this 25th day of December, A. D. 1945.

Leslie Frazer (Seal)   First Assistant Commissioner of Patents.